US007908590B1

(12) United States Patent
Min et al.

(10) Patent No.: US 7,908,590 B1
(45) Date of Patent: Mar. 15, 2011

(54) SYSTEM AND METHOD FOR AUTOMATICALLY CREATING TEST CASES THROUGH A REMOTE CLIENT

(75) Inventors: Jeehong Min, Pasadena, CA (US); Matthew David Love, Encinitas, CA (US); Wayne P. Ariola, Jr., Los Angeles, CA (US)

(73) Assignee: Parasoft Corporation, Monrovia, CA (US)

( * ) Notice: Subject to any disclaimer, the term of this patent is extended or adjusted under 35 U.S.C. 154(b) by 1080 days.

(21) Appl. No.: 11/559,356

(22) Filed: Nov. 13, 2006

Related U.S. Application Data (63) Continuation of application No. 11/552,831, filed on Oct. 25, 2006, now abandoned.

(60) Provisional application No. 60/778,696, filed on Mar. 2, 2006.

(51) Int. Cl.
*G06F 9/44* (2006.01)

(52) U.S. Cl. ........ 717/124; 717/126; 717/127; 717/130; 717/131; 714/38

(58) Field of Classification Search ........................ None
See application file for complete search history.

(56) References Cited

U.S. PATENT DOCUMENTS

| | | | | |
|---|---|---|---|---|
| 5,371,883 A * | 12/1994 | Gross et al. | ...................... | 714/38 |
| 5,778,169 A * | 7/1998 | Reinhardt | ........................ | 714/38 |
| 5,784,553 A | 7/1998 | Kolawa et al. | | |
| 6,002,871 A * | 12/1999 | Duggan et al. | ................ | 717/135 |
| 6,067,639 A | 5/2000 | Rodrigues et al. | | |
| 6,085,029 A | 7/2000 | Kolawa et al. | | |
| 6,182,245 B1 * | 1/2001 | Akin et al. | ....................... | 714/38 |
| 6,249,882 B1 * | 6/2001 | Testardi | ........................... | 714/38 |
| 6,298,353 B1 * | 10/2001 | Apte | ..................... | 1/1 |
| 6,336,217 B1 * | 1/2002 | D'Anjou et al. | ............... | 717/121 |
| 6,434,628 B1 * | 8/2002 | Bowman-Amuah | ............ | 714/48 |
| 6,539,396 B1 * | 3/2003 | Bowman-Amuah | .......... | 707/769 |
| 6,643,652 B2 * | 11/2003 | Helgeson et al. | ..................... | 1/1 |
| 6,748,583 B2 * | 6/2004 | Aizenbud-Reshef et al. | | 717/127 |
| 6,775,824 B1 * | 8/2004 | Osborne et al. | ............... | 717/125 |
| 6,817,010 B2 * | 11/2004 | Aizenbud-Reshef et al. | | 717/127 |
| 6,895,578 B1 | 5/2005 | Kolawa et al. | | |
| 6,934,934 B1 * | 8/2005 | Osborne et al. | ............... | 717/126 |
| 6,966,013 B2 | 11/2005 | Blum et al. | | |
| 6,993,747 B1 * | 1/2006 | Friedman | ....................... | 717/124 |
| 6,999,956 B2 * | 2/2006 | Mullins | ................................ | 1/1 |
| 7,000,224 B1 * | 2/2006 | Osborne et al. | ............... | 717/125 |
| 7,167,870 B2 | 1/2007 | Avvari et al. | | |
| 7,237,231 B2 | 6/2007 | Lambert | | |

(Continued)

OTHER PUBLICATIONS

Title: Using the information: incorporating positive feedback information into the testing process, author: Kwok Ping Chan et al, source: IEEE, dated: Sep. 19, 2003.*

(Continued)

*Primary Examiner* — Chameli C Das (74) *Attorney, Agent, or Firm* — Christie, Parker & Hale, LLP.

(57) ABSTRACT

A system and method for generating test cases for a computer program. The method and system include invoking execution of the computer program via a remote client and monitoring the execution of the computer program. Information about execution path of the computer program is collected and then the execution of the computer program is stopped via the remote client. One or more test cases are then generated utilizing the collected information. In one embodiment, the remote client is a computer test tool and the computer program is a web application.

22 Claims, 6 Drawing Sheets

U.S. PATENT DOCUMENTS

| | | | |
|---|---|---|---|
| 7,299,453 B2 * | 11/2007 | Sluiman et al. | 717/124 |
| 7,340,725 B1 | 3/2008 | Robinson et al. | |
| 7,373,636 B2 | 5/2008 | Barry et al. | |
| 7,478,365 B2 | 1/2009 | West et al. | |
| 7,584,455 B2 * | 9/2009 | Ball | 717/124 |
| 7,594,220 B2 * | 9/2009 | Kodosky et al. | 717/125 |
| 2002/0087950 A1 | 7/2002 | Brodeur et al. | |
| 2002/0120918 A1 * | 8/2002 | Aizenbud-Reshef et al. | 717/127 |
| 2003/0037316 A1 * | 2/2003 | Kodosky et al. | 717/127 |
| 2003/0041288 A1 | 2/2003 | Kolawa et al. | |
| 2004/0041827 A1 | 3/2004 | Bischof et al. | |
| 2004/0044992 A1 | 3/2004 | Muller et al. | |
| 2005/0166094 A1 | 7/2005 | Blackwell et al. | |
| 2005/0229044 A1 * | 10/2005 | Ball | 714/38 |
| 2006/0101404 A1 | 5/2006 | Popp et al. | |

OTHER PUBLICATIONS

Title: Formal Verification of digital systems by automatic reduction of data paths, source: IEEE, dated: Aug. 6, 2002.*

Title: Automatic Unit Test Data Generation Using Mixed-Integer Linear Programming and Execution Trees, author: Lapierre et al, source: IEEE, dated: Aug. 30, 1999.*

* cited by examiner

FIG. 6

# SYSTEM AND METHOD FOR AUTOMATICALLY CREATING TEST CASES THROUGH A REMOTE CLIENT

CROSS-REFERENCE TO RELATED APPLICATION

This patent application is a continuation of U.S. patent application Ser. No. 11/552,831, filed Oct. 25, 2006, now abandoned which claims the benefit of the filing date of U.S. Provisional Patent Application Ser. No. 60/778,696, filed on Mar. 2, 2006 and entitled "SYSTEM AND METHOD FOR AUTOMATICALLY CREATING TEST CASES THROUGH A REMOTE CLIENT," the entire content of which is hereby expressly incorporated by reference. This patent application is also related to U.S. patent application Ser. No. 11/396,168, filed on Mar. 30, 2006, and entitled "SYSTEM AND METHOD FOR TEST GENERATION."

FIELD OF THE INVENTION

The present invention relates generally to testing computer software; and more particularly to a system and method for creating test cases through a remote client.

BACKGROUND OF THE INVENTION

The problem of writing error-free computer programs has plagued programmers since the beginning. Sophisticated schemes for automatically discovering program errors and bugs of all kinds, including lexical, syntactic, semantic and logical, have been developed.

Reliable and successful software is developed through sound, efficient and thorough testing. However, software testing is labor intensive and expensive and accounts for a substantial portion of commercial software development costs.

At the same time, software testing is critical and necessary to achieving quality software. Typically, software testing includes test case generation, test case execution and validation, and regression testing.

Most of software developers understand that the longer an error is allowed to remain in the software before it is discovered, the more expensive it becomes to fix. With vigilant testing from the earliest phases of the software lifecycle, software development teams find errors earlier and reduce the likelihood of discovering the error further down in the software lifecycle. Early detection reduces the cost of fixing each error, which in turn, reduces the cumulative cost of fixing the thousands of errors that typically surface in the course of a project.

For example, for testing of a complex web application, the application is deployed in a staging server environment for comprehensive testing before deployment to a live production environment. The web application is itself multi-tiered, complex and is comprised of other multi-tiered components. As such, integration and deployment of new versions of the web application on the staging environment is not trivial. In this context, the traditional feedback loop between quality assurance (QA) team and development team faces serious challenges.

In a software test cycle, when the software is first tested, a bug may be found and reported. The bug is then reproduced, fixed and verified to prevent it from occurring again. In an ideal setting, the QA team is able to verify that the requirements of the application are satisfied by the web application deployed on the staging server. Those requirements that are not met, for example bugs, are documented and the list of bugs is passed to development team. The development team then fixes these bugs. The web application with the bug fixes is re-deployed on the staging server and is verified by QA team to make sure that all the requirements are met. This can be an iterative process by which the number of bugs is reduced to zero.

What many companies face is a lengthy, drawn out cycle to re-deploy the web application on the staging server due to the complex nature of the web application and ensuing integration issues. As a result, it becomes difficult for the development team to correlate the bug with specific code to reproduce the bug, and to verify that the bug has been fixed. The development team is not able to test its code in the context of the web application. Even if this was possible, the number of times that the code is updated in the web application must be minimized. Therefore, there is a need for an effective way to reproduce, fix, and verify the bug outside the staging server environment.

SUMMARY

In one embodiment, the present invention is a method and system for generating test cases for a computer program. The method and system include invoking execution of the computer program via a remote client; monitoring the execution of the computer program; collecting information about execution path of the computer program; stopping the execution of the computer program via the remote client; and generating one or more test cases utilizing the collected information. In one embodiment, the remote client is a computer test tool. In one embodiment, the test cases are unit test cases, in which the stubs are automatically generated. In one embodiment, the computer program is a web application.

DETAILED DESCRIPTION

In one embodiment, the present invention enables automatic creation of code level, for example, programming languages such as JAVA™, test cases via the exercise of a Web App Server through a remote client. The method and system of the present invention allow a QA team to perform a web application testing on a staging server environment and generate test artifacts that enable the development team to properly reproduce, fix, and verify the bugs outside of the staging server environment.

Accordingly, the QA team is able to give the development team more than just a bug report. The QA team can give the development team information about what happened at the code level. This information about what happened at the code level can be converted to an executable code that reproduces the bug. This code is executed outside of the context of a staging server environment. Because the bug can be reproduced by executing the code in a developer environment, the bug can be fixed and verified within the developer environment. When the requirements are met during QA testing, regression tests at the code level are automatically created. The QA team thus creates regression tests that increase the comprehensiveness and coverage of the code. These regression tests can be used by the development team to effectively aid during modification of the code.

In one embodiment, the method and system of the invention can also be used to create code level regression tests that represent the actual use case scenarios. The invention enables rapid, automated creation of code level regression test cases that may be hard to write from scratch.

Figure 1:
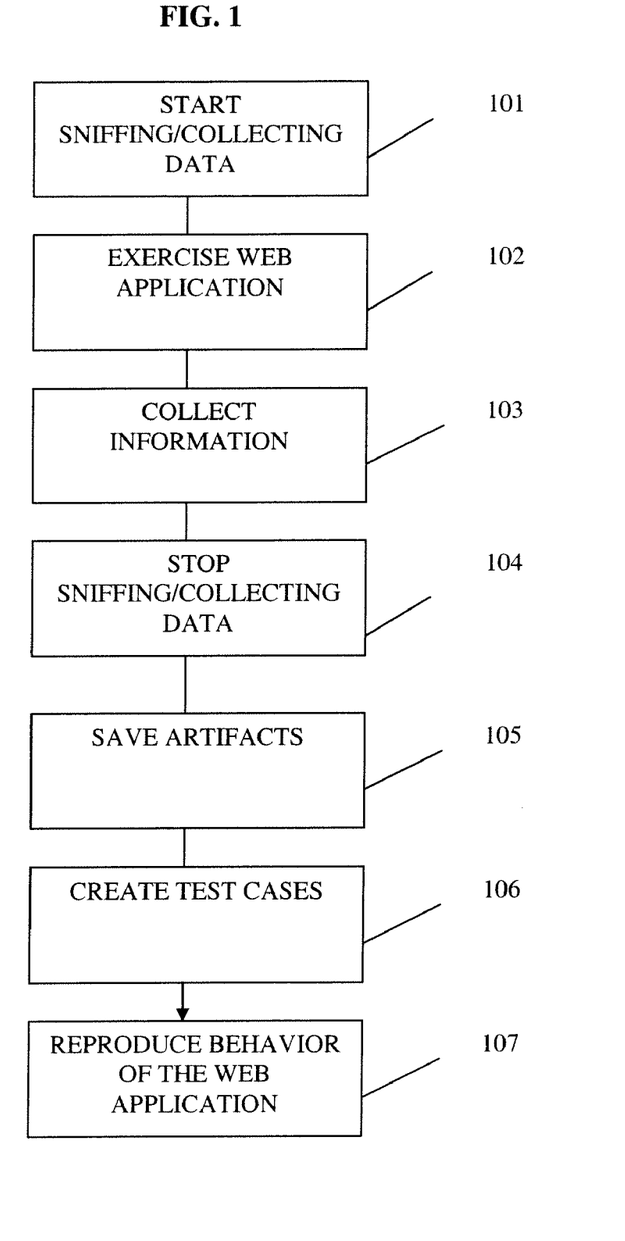
FIG. 1 is an exemplary process flow diagram according to one embodiment of the present invention.

FIG. 1 is an exemplary process flow, according to one embodiment of the present invention. As shown in block 101, a remote client instructs a monitoring module (sniffer) to start sniffing or collecting information from a, for example, JAVA Virtual Machine (JVM). In block 102, the remote client exercises the web application by sending request(s) to the web application. The sniffer collects information about the execution path from the JVM, in block 103. In block 104, the remote client alerts the sniffer to stop sniffing or collecting information. The sniffed artifacts are saved to a file, in block 105. Code level test cases are created from the sniffed artifacts, in block 106. These code level test cases can be used to reproduce behavior of the web application that was observed, as shown in block 107. In one embodiment, the test cases are unit test cases and the stubs for the unit cases are automatically generated.

In one embodiment, the web application is a JAVA™ application being tested. The web application may be integrated with other web applications or connected to various back end data bases. In one embodiment, the sniffer lies dormant until it is turned on by the remote client.

The remote client can be other test tools, such as SOAtest™, and WebKing™ from Parasoft® Corp. For example, SOAtest™ is used if the web application is exposed as a web service, while WebKing™ may be used for typical web applications with a web interface. Users exercise the web application by sending requests to the web application through either SOAtest™ or WebKing™. For the rest of this document, focus is on SOAtest™ usage as an illustrative example of the remote client. SOAtest™ emulates a web service consumer by sending requests and receiving responses. Each request to the web application causes some portion of the code to be exercised. U.S. patent application Ser. No. 10/214,209, filed Aug. 7, 2002, and entitled "System And Method For Testing Of Web Services," the entire context of which is hereby incorporated by reference, describes SOAtest™ in detail.

While the QA person is using SOAtest™ to test the web application, she may notice undesirable behavior or bug in the web application. At this point, she turns on the sniffer by sending a message from SOAtest™ to the sniffer. She then resends the request(s) that causes the undesirable behavior to show up. As the code is exercised again, the sniffer collects information from the JVM. Some of the information gathered include what classes are exercised, what methods are called, what the input parameters to those methods are, what the return parameters are, and the like. After the request(s) have been sent and the responses received, the QA person turns the sniffing off by sending another message to the Sniffer.

Figure 2:
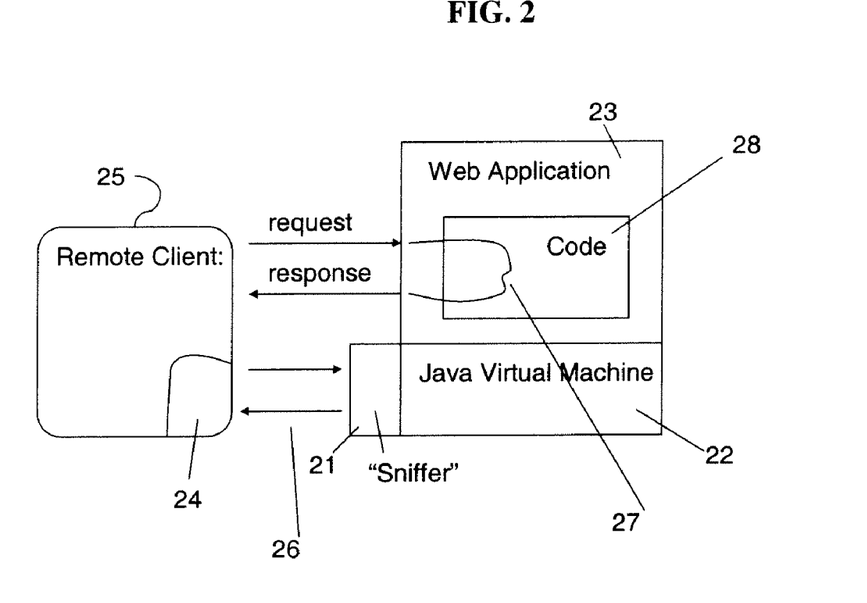
FIG. 2 is an exemplary system block diagram according to one embodiment of the present invention.

FIG. 2 is an exemplary architectural block diagram of one embodiment of the system of the present invention. A remote client 25 instructs a sniffer 21, for example, a JVM 22 to start monitoring. The sniffer 25 records each combination of inputs used when designated methods are invoked during live execution of an application. A Sniffer Controller 24 in the remote client 25 instructs the sniffer when and what to record. Through a remote API (e.g., in the sniffer), testers are able to choose when and what to record. The sniffed artifacts 26 that capture execution path 27 through the code 28 are then returned to the remote client 25. U.S. patent application Ser. No. 11/396,168, entitled "System And Method For Test Generation," the entire context of which is hereby incorporated by reference, describes a sniffer in more detail.

Figure 3:
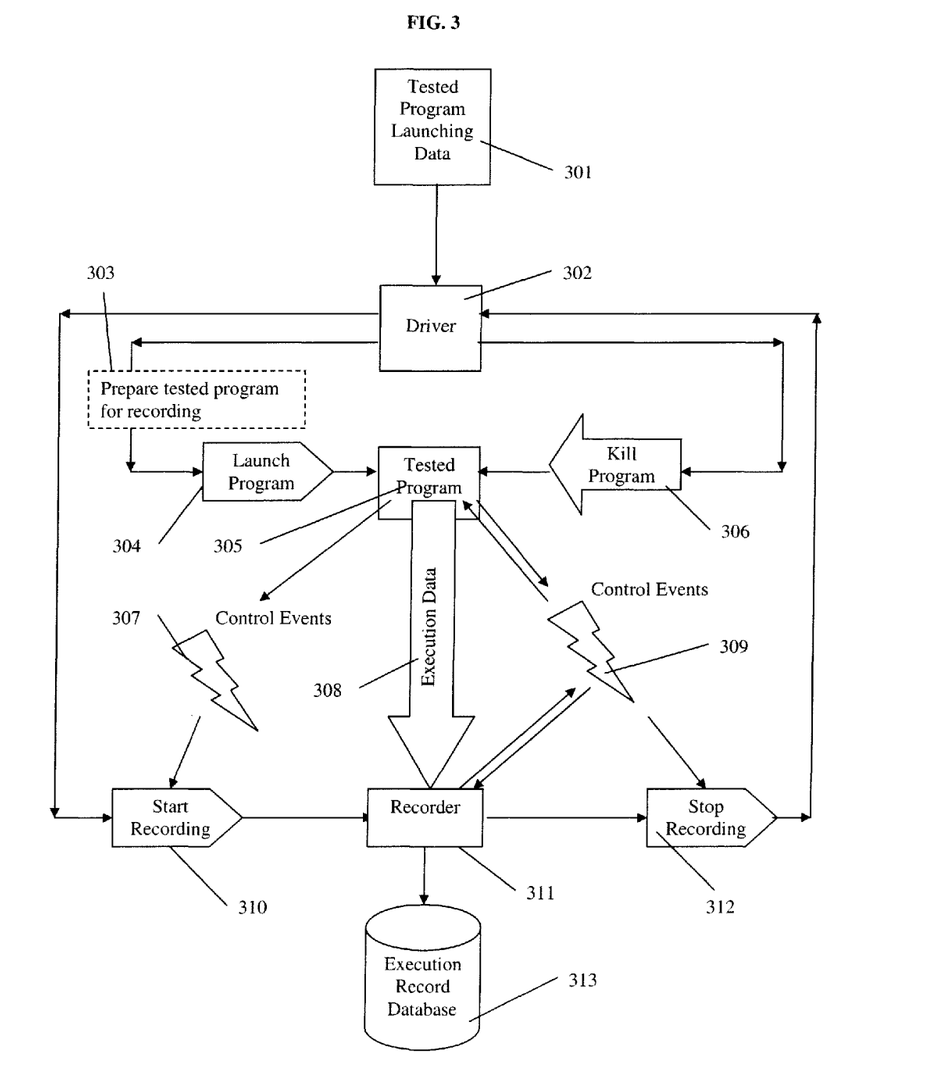
FIG. 3 is an exemplary block diagram for monitoring execution of a computer program and recording execution data, according to one embodiment of the present invention.

FIG. 3 is an exemplary block diagram for monitoring execution of a computer program, for example a web application and recording execution data, according to one embodiment of the present invention. A driver program 302 is launched with a Tested Program Launching Data 301. This data describes to a driver, for example, a remote client 302 how to set the environment and what parameters to pass to the tested program. The tested program is prepared for recording (303) by enabling the runtime system and providing runtime program information required to record program stats. This may be done, for example, by instrumenting source or binary code of the tested program, by enabling debugging interfaces of the program type to access runtime values, profiling interfaces available for the given program type for notification of runtime events, or by using a combination of the above. The program may be prepared, for example, before launching, while it is being loaded into the memory, or when a particular part of the program is about to be executed.

For example, data can be acquired for processes ran on Java VM using Debugger Interface (DI), Profiler Interface (PI), or Tool Interface (TI) for Sun Microsystem's™ Java Development Kit™ (JDK). Alternatively, the source or the binary code can be instrumented. Also, the combination of the above mentioned data acquisition means can be employed. Such profiling interfaces provide data about method invocation sequence and argument values. For JAVA™ applications, these interfaces are known as Java Virtual Machine Profiler Interface (JVMPI), Java Virtual Machine Debugger Interface (JVMDI), and Java Virtual Machine Tools Interface (JVMT).

The driver program then initializes a recorder module 311. Control events 307 and 309 are sent to the recorder. These events may be sent by the driver 302, the monitored program, or both. Example of control events include, "Start Recording" 310, and "Stop Recording" 312. Events also control the granularity of recorded data. For example, "Record method calls", "Record method calls and objects", etc. Execution data 308 is then sent to the recorder 311.

Recorder 311 may send control events to the monitored program 305 or the driver 302. These events may be, for example, data granularity control events like, turning on/off object recording, execution control events like, "suspend execution" or "kill". Execution data is then processed by the recorder and stored in an Execution Record Database 312. The tested program is prepared for recording (303) by appending arguments for the launch to enable the required program type interfaces. The prepared program is then launched in 304, and terminated in 306.

Figure 4:
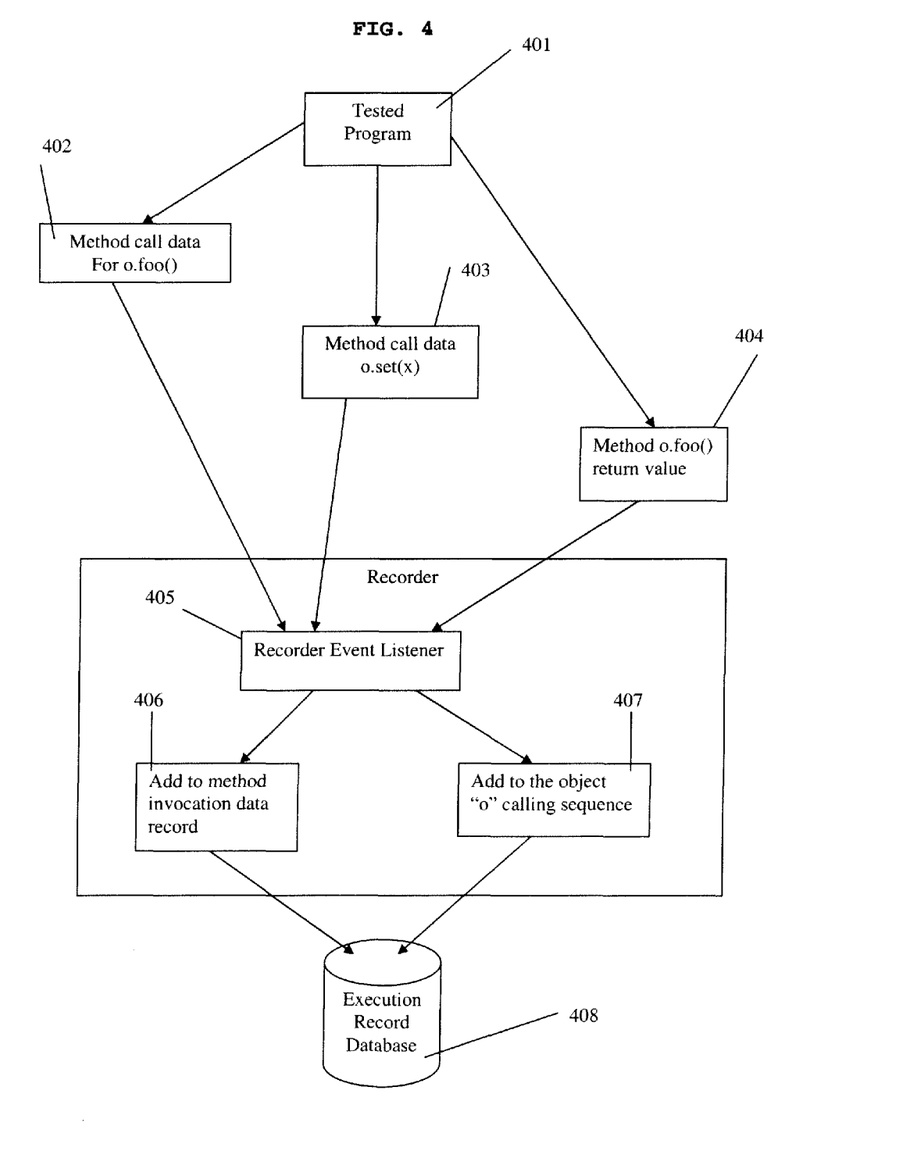
FIG. 4 is an exemplary block diagram for recording execution data of the computer program, according to one embodiment of the present invention.

FIG. 4 is an exemplary block diagram for recording execution data of a computer program, for example a web application, according to one embodiment of the present invention. As depicted, data necessary for recreating the state of the tested application, or of a part of the tested application 401, is recorded. In one embodiment, the data includes

```
Record method calls (406) including
    Method data
        For each unique method type + name + signature
        record
            Invocation data (402, 403)
                Data uniquely identifying a thread in
                which the method is invoked
                Instance object on which the method was
                invoked (if instance method)
                    origin (the way to generate
                    instance of the object in its
                    given state)
                method arguments
            order (place) of the method invocation
            amongst other method invocations (regardless
            of the thread)
        Method's return value (404)
    Method execution context information
        Information about the objects and processes the
        method would interact with, e.g., information
        about an application server the method will
        interact with
        Environmental variables information
    Record object's calling sequence (calling sequence that
    lead to the creation of the object in its current state)
    (407). For example,
        Object o = ObjectConstructor( );
        o.foo( );
        o.set(x);
```

In one embodiment, sequence is implied form the temporal recording of the sequence of calls, that is, no notion of child/parent calls is recorded per se, but rather, is implied from the recorded sequence). The Recorder Event Listener 405 writes events sequentially to the Execution Record Database 408, which preserves the order of events for later processing by a test generation system.

The collected information is then sent to the remote client at the end of testing. In one embodiment, the collected information is in a proprietary binary format. The collected information or sniffed artifacts are then given to a developer. From the sniffed artifacts, the execution path through the code is then reconstructed. Based on the execution path, code level test cases can be created that exercise the code in the same way as the requests from the remote client. In one embodiment, the output format of the code level test cases is industry standard JUnit™ test case format.

In one embodiment, the sniffer records method invocation events that were made by the QA analyst, at the code level. The necessary information to recreate the calling sequence/execution path is thus made available. The invention reads and correlates the method invocation events recorded in a result file as well as deserializing objects within the file. In one embodiment, relevant method invocation events such as, method entry, exit, call and called are considered.

These events are achieved through bytecode instrumentation. The first two, method entry and exit are used for calling sequences and recording of input parameters used so that the made method invocation can be recreated. There may be instances where stubs (i.e. placeholder method calls) are needed. The method call event specifies that a call is about to be made so that the test can stub the call to that method.

Figure 5:
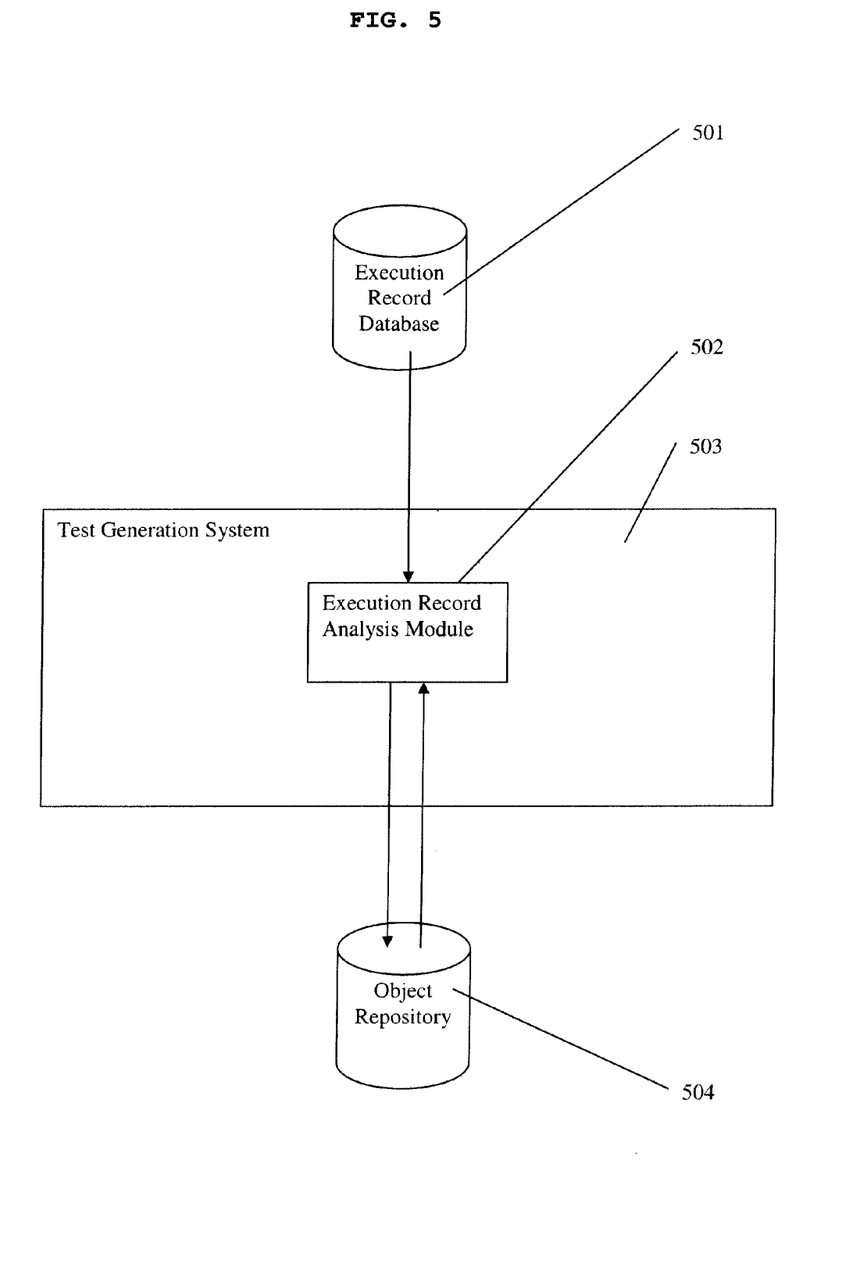
FIG. 5 is an exemplary block diagram for adding inputs to an object repository, according to one embodiment of the present invention.

FIG. 5 is an exemplary block diagram for adding inputs to an object repository, according to one embodiment of the present invention. As shown, execution Data Analysis module 502 of the Test Generation System 503 analyses records in Execution Record Database 501 and adds objects that qualify to be inputs for test cases to the Object Repository 504. Qualified objects are objects that will be needed as function inputs or other stimulus for a unit test. The generated unit test references the object in the repository where the state information of the object has been saved. However, there is an option to add all observed objects, or only specific ones that match a custom list or filter pattern. Optionally, only objects created in test case generation can be added to the Object Repository 504.

Figure 6:
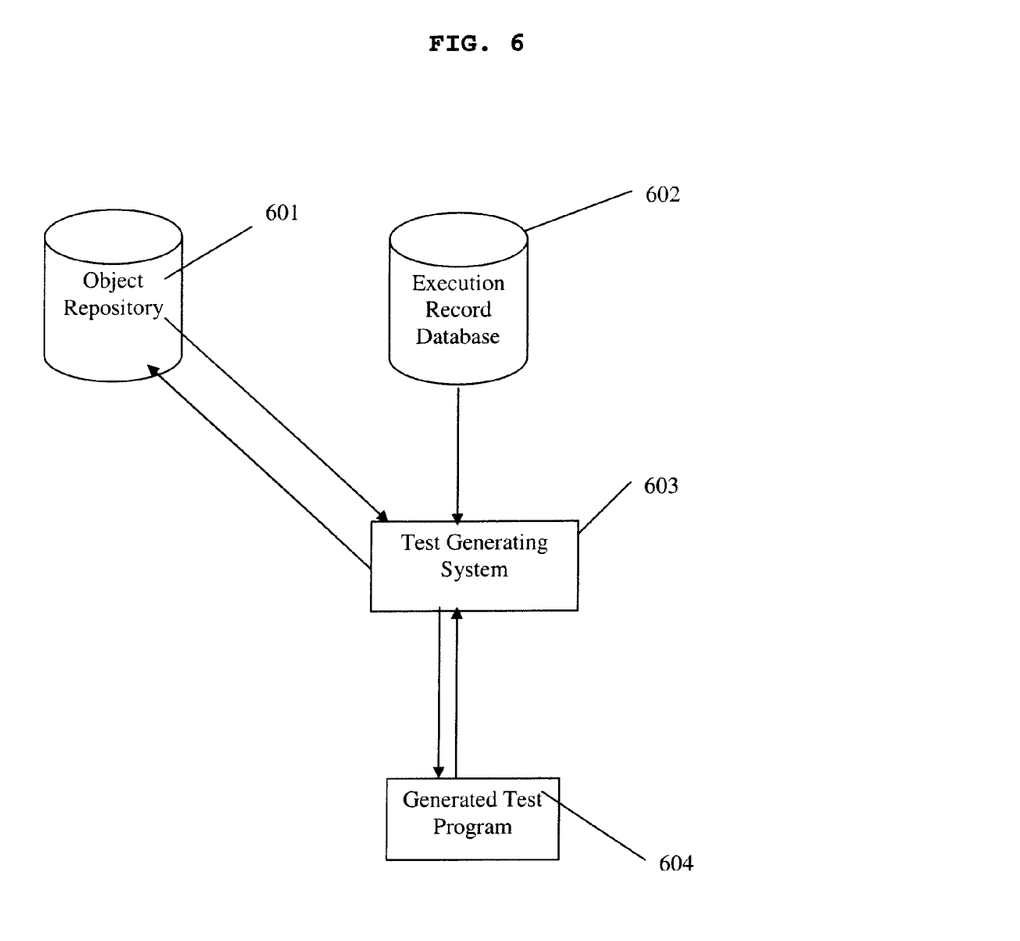
FIG. 6 is an exemplary block diagram for generating test cases from recorded data.

In one embodiment, objects may be added to the Object Repository using one or more of the following methods,
  Field-wise (by recording the values of all the fields of the object)
    Optionally limit the depth of the recording
  "Recipe" (record the calling sequence leading to the object creation)
  use serialization and deserialization methods provided either by the language API or by the user-defined API FIG. 6 is an exemplary block diagram for generating test cases from recorded data, according to one embodiment of the present invention. As shown, Test Generating System 603 uses information from Execution Record Database 602 to create realistic test cases by recreating tested program's execution context and uses information from Object Repository 601 to vary parameters of the test cases.

In one embodiment, for each tested method, the Test Generating System 603:
  Generates test cases based on recorded inputs and outcomes
  Sets test method execution context
    Create objects, or spawn process(es) that tested method may have to interact with; e.g., an application server object.
In one embodiment, the input stimulus to generated unit tests include:
  Constructed Object arguments as well as primitives values are passed as method arguments
  Fields are initialized in the necessary static classes
  Construct instances of objects to invoke non-static methods on
In one embodiment, the outcomes are:
  Return values
  State of the instance object
  States of the method arguments
  State of effected fields of static classes
In one embodiment, the object inputs and outcomes are generated based on calling sequences and filtering data. Test generation system has an option to limit number of calls in the sequence leading to the object creation to improve performance. Effectively, the object states which require more than a maximal allowed number of method calls are not used in test generation.
  Objects from the Object Repository may contain a snapshot of the recorded state and can be reloaded in a unit test at some point using the Object Repository API.
In one embodiment, filtering data for generation and generation options may include:
  Record only methods form the tested projects.
  Generate up to a maximum number of test cases for a given method.
  Generate only test cases that require no more than a maximum allowed number of calls to instantiate each of pre-requisite objects.
  Add only test cases that generate additional coverage, discard the rest; based on coverage for lines and/or branches.
  Each tested method should have at least one test case designed specifically to test it.
  Avoid using certain objects for method's inputs and outcome verification, for example, test classes are not tested
  do not use "dangerous objects" for inputs, e.g., objects that may access and modify restricted resources like live databases.
  Generate only test cases that test code created and modified up to some point back in time, for example,
    do not generate test cases that use objects coded before the "break away" date,
    do not generate test cases for methods modified before the "break away" date, and/or
    logical AND of the above options.
  Generate only test cases for the first set of code executed when monitoring of the tested application started, for example,
    do not generate test cases for code that will be executed indirectly from other test cases,
    generate tests for calls executed after the initial call into the set of tested code returns, and/or
    generate one test with all such calls that were at the same level of execution as the first recorded call when monitoring started.

As an example, during execution of a JAVA™ application, the present invention monitors the Java Virtual Machine and produces functional unit tests based on what it observes by generating unit tests in JAVA™ source code that use the JUnit framework and contain test stimulus derived from recorded runtime data. These tests can then be validated and executed as part of the testing infrastructure to ensure that the code is operating to specification.

In one embodiment, the generated test cases are arranged correctly to reflect the execution path taken by the QA analyst. Therefore, if the QA analyst sniffed a sequence of actions that caused a bug, the invention will recreate that sequence. This will show the developers what they need to do to reproduce the bug.

As described above, test classes that represent the sequence of method invocations taken by the QA analyst can now be created. Accordingly, a test method for each method invocation is created. If a method invocation returns an object, a regression control for the object can be created. In other words, the object's component fields are examined and checked to assure that they match the expected values.

In one embodiment, the calling sequence is reconstructed using the events mentioned before. Serialized objects from the Java Development Kit (JDK) will be recreated using some predefined calling sequences of public JDK API for those types of objects. For example, a serialized Vector of Strings can be recreated as a calling sequence that includes the Vector constructor and an add invocation for each String. Objects from the JDK that have not been serialized are stubbed. Objects whose constructors have been recorded are recreated using that same constructor and input values. If the constructor has not been recorded, the object is stubbed. Using this calling sequence a set of intermediate test cases are generated.

The set of intermediate test cases are then executed through a test case refinement process. The test execution refinement process is used to collect additional runtime data about the test cases. In one embodiment, preliminary JUnit source code is generated to execute in a JUnit environment and record additional data. The runtime test data may include coverage related to tests to support removing tests that do not increase coverage with respect to the tests that are already present. In one embodiment, an intermediate test run is executed and the outcomes of the method invocations are recorded. The invention then takes those outcomes and translates them into JUnit™ assertions (e.g., junit.framework), which are used as regression controls. When creating assertions for a return object, its accessor methods such as getXXX( ) is XXX( ) toString( ) and the like are of interest. In the intermediate test run accessor methods that have not been called yet are also called so that the coverage is optimized. In one embodiment, the result of this process is a regression JUnit™ test suite.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for generating unit test cases for a computer program, the method comprising:
    invoking execution of the computer program via a remote client;
    monitoring the execution of the computer program;
    collecting information about execution path of the computer program;
    stopping the execution of the computer program via the remote client;
    generating one or more executable unit test cases utilizing the collected information, wherein stubs for the one or more unit test cases are automatically generated from the collected information; and
    executing the one or more executable unit test cases, without executing the computer program, to reproduce behavior of a portion of the computer program.

2. The method of claim 1 further comprising testing a portion of the computer program utilizing the generated one or more unit test cases with varying parameters.

3. The method of claim 2 further comprising reporting an error and indicating the place in the computer program where the error is located.

4. The method of claim 1 wherein testing a portion of the computer program comprises regression testing the portion of the computer program.

5. The method of claim 4 further comprising storing the identified objects in an object repository; and recording the values of all the fields of the object.

6. The method of claim 5 wherein the storing the identified objects in the object repository comprises recording calling sequence leading to the object creation.

7. The method of claim 5 wherein the storing the identified objects in the object repository comprises recursively serializing field values of the objects to primitive values.

8. The method of claim 5 wherein the storing the identified objects in the object repository comprises storing one or more of the group object types, field names, null values, primitive values, and references between objects.

9. The method of claim 1 further comprising storing the collected information; and analyzing the stored collected information to identify objects for input to unit test cases.

10. The method of claim 1 further comprising varying the parameters of the generated unit test cases utilizing the collected information.

11. The method of claim 1 wherein the collected information includes data uniquely identifying a thread in the execution path in which a method is invoked, instance object on which the method was invoked, method arguments, place of the method invocation amongst other method invocations, and return value of the methods.

12. The method of claim 1 wherein the collected information includes information about the objects and processes a method would interact with.

13. The method of claim 1 further comprising specifying the type of information to collect.

14. The method of claim 1 wherein the collected information includes objects calling sequence and the objects calling sequence is implied from temporal recording of sequence of calls from the execution of computer program.

15. The method of claim 1 further comprising modifying the one or more unit test cases and utilizing the modified one or more unit test cases to generate one or more new unit test cases.

16. The method of claim 1 wherein the monitoring the execution of the computer program comprises profiling interfaces available for a given program type to provide data about method invocation sequence and argument values.

17. The method of claim 1 wherein the remote client is a computer test tool.

18. The method of claim 1 wherein the computer program is a web application.

19. A system for generating unit test cases for a computer program comprising:

a remote client for invoking and stopping execution of the computer program on a first computer;

a sniffer module for monitoring the execution of the computer program and for collecting information about execution path of the computer program;

means for generating one or more unit test cases utilizing the collected information wherein stubs for the one or more unit test cases are automatically generated from the collected information; and a second computer for executing the one or more executable unit test cases, without executing the computer program, to reproduce behavior of a portion of the computer program.

20. The system of claim 19 wherein the remote client is a computer test tool.

21. The system of claim 19 further comprising means for testing a portion of the computer program utilizing the generated one or more unit test cases with varying parameters.

22. The system of claim 19 further comprising a memory for storing the collected information; and means for analyzing the stored collected information to identify objects for input to unit test cases.

* * * * *